(12) United States Patent
Bathurst

(10) Patent No.: US 10,640,964 B1
(45) Date of Patent: May 5, 2020

(54) MULTI-OPERATIONAL MODE, METHOD AND SYSTEM FOR OPERATING A STORMWATER MANAGEMENT (SWM) FACILITY

(71) Applicant: Century Engineering, Inc., Hunt Valley, MD (US)

(72) Inventor: Robert G. Bathurst, Glen Burnie, MD (US)

(73) Assignee: Century Engineering, Inc., Hunt Valley, MD (US)

( * ) Notice: Subject to any disclaimer, the term of this patent is extended or adjusted under 35 U.S.C. 154(b) by 0 days.

(21) Appl. No.: 16/057,020

(22) Filed: Aug. 7, 2018

(51) Int. Cl.
*E03F 1/00* (2006.01)
*G05B 19/042* (2006.01)

(52) U.S. Cl.
CPC .............. *E03F 1/00* (2013.01); *G05B 19/042* (2013.01)

(58) Field of Classification Search
CPC ................................ E03F 1/00; G05B 19/042
USPC .......................................................... 700/282
See application file for complete search history.

(56) References Cited

U.S. PATENT DOCUMENTS

| | | | | |
|---|---|---|---|---|
| 4,987,913 A * | 1/1991 | Kodate | ..................... | E03F 5/22 137/1 |
| 5,342,144 A | 8/1994 | McCarthy | | |
| 8,591,147 B2 | 11/2013 | Quigley | | |
| 9,772,609 B2 | 9/2017 | Goodman | | |
| 2006/0034662 A1* | 2/2006 | Burkhart | ................. | E03F 1/005 405/36 |
| 2006/0108270 A1* | 5/2006 | Kosanda | ................... | C02F 1/32 210/198.1 |
| 2011/0120561 A1* | 5/2011 | Quigley | .................... | E03F 1/00 137/1 |
| 2014/0350737 A1* | 11/2014 | Goodman | ........... | G06F 17/5009 700/282 |

* cited by examiner

*Primary Examiner* — Kenneth M Lo
*Assistant Examiner* — Michael W Choi
(74) *Attorney, Agent, or Firm* — Larry J. Guffey

(57) ABSTRACT

The present invention presents both a method and system for controlling a stormwater management facility to operate in any one of a plurality of operational modes, each of which has differing environmental benefits resulting from its treatment of the stormwater that passes through the facility. A preferred embodiment of this system includes: an actuated control valve, a depth sensor, a valve controller that has internet connectivity and sensor interfaces and a user input means, controller software configured to control the operation of the control valve to operate in one of its plurality of operating modes, and private-cloud-based, internet-accessible, engine software that is configured to utilize weather forecasts to calculate a temporally-varying, targeted depth for the stormwater in the facility that maximizes the volume of stormwater treated in the SWM facility.

20 Claims, 2 Drawing Sheets

MULTI-OPERATIONAL MODE, METHOD AND SYSTEM FOR OPERATING A STORMWATER MANAGEMENT (SWM) FACILITY

BACKGROUND OF THE INVENTION

1. Field of the Invention

The present invention relates generally to the management of stormwater facilities that seek to control urban stormwater runoff. More particularly, the present invention relates to systems and methods for operating a stormwater facility in any one of a plurality of operational modes to yield various environmental benefits.

2. Description of the Related Art

Since at least 1972, the United States Environmental Protection Agency (USEPA) has been investigating the causes of and solutions for the nation's water pollution problems. Urban stormwater runoff due to storms or precipitation events has been identified as a significant contributor to this problem since stormwater carries with it pollutants such as bacteria, heat, phosphorus, nitrogen, and sediment. Collectively these pollutants have been identified as significant contributors to the decline of the health of the natural streams and other natural bodies of water into which this stormwater runoff eventually flows.

In 1978, the USEPA launched the Nationwide Urban Runoff Program (NURP) to build, in part, a body of knowledge on the impacts of urban stormwater runoff and to develop practical engineering data on the relative cost and effectiveness of various ways for controlling urban stormwater runoff.

Stormwater retention or stormwater management (SWM) facilities (e.g., ponds and wetlands with appropriate inflow conduits and at least one outflow conduit with a control valve that is used to control the volume or depth of water in the SWM facilities and regulate the flowrate at which water is released into the nearby natural streams and other natural bodies of water) were identified as a highly effective means for capturing, treating and removing the pollutants in the flows of urban stormwater runoff. See U.S. Pat. No. 5,342,144. These facilities achieve such pollution reduction results by effectively serving as intermediary, water holding facilities where the urban stormwater runoff is collected and held for sufficient periods of time in a relatively quiescent state so as to allow for, among other thing, the off-gassing of nitrogen, the denser-than-water pollutants that are suspended in the runoff, and any phosphorous that may be attached to them, to fall under the influence of gravity out of solution and to the bottom of the SWM facility.

The pollutant removal effectiveness in these SWM facilities is highly dependent upon their physical attributes (e.g., the path length of the stormwater as it passes through the facility and the ratio of the facility's permanent, water storage volume to the stormwater runoff volume collected during a typical precipitation event). SWM facilities are typically designed to increase the path length of the stormwater so as to encourage the mixing of the newly entering stormwater with that which has been held in the SWM facilities for longer duration and therefore is cooler and has lower pollutant levels. Consequently, SWM facility designs that allow for "short circuit" flow paths between their points of inflow and outflow are discouraged.

Additionally, SWM facilities are designed to have a high ratio of permanent water storage volume to the typical stormwater runoff volume so as to provide the water storage volume with a longer residence time in the SWM facility. Mathematical models for the processes that occur when the stormwater is being held in the SWM facility predict that a 90% reduction in sediment load (and attached pollutants) can be achieved during normal quiescent conditions (i.e., the time period between rainfall events).

The pollutant removal effectiveness in these SWM facilities can also be greatly impacted by their methods of operation. The means for doing this have expanded greatly in recent years with advances in the state of wireless connectivity and microcomputer technology and the use of automated or actuated control valves to regulate the outflow from these SWM and other similar facilities (e.g., water storage facilities where water is stored for extended lengths of time and later used for a variety of purposes, e.g., irrigation, watering livestock, municipal water supply, recreation, and hydroelectric power generation). For the automated regulation of water outflow from general storage facilities see U.S. Pat. Nos. 8,591,147 and 9,772,609.

Real-time precipitation forecast data can now be inputted into the SWM facility or routing or actuated-control-valve software that operates the SWM facility's automated or actuated control valve. The advantage of this is that such SWM-facility software can automatically make changes to the settings of the facility's control valve so as to regulate, in anticipation of forecasted precipitation events, the volume of the water stored in a SWM facility (e.g., reduce it in anticipation of a forecasted precipitation event so as to prevent the overflowing or discharge and "short circuiting" of the SWM facility).

Despite these advantages in the means for controlling the operation of SWM facilities, there is still the need for further improvements to this technology. For example, there is still the need to increase the volume of stormwater that can be adequately treated by a given-size SWM facility.

SUMMARY OF THE INVENTION

Recognizing the need for improvements in the means for controlling the operation of stormwater management (SWM) facilities (e.g., wet ponds and shallow wetland systems), the present invention presents both a Smart Stormwater Management (SmartSWM) method and system for controlling a SWM facility to operate in any one of a plurality of operational modes, each of which has differing environmental benefits resulting from its treatment of the stormwater that passes through such SWM facilities.

In accordance with a preferred embodiment of the present invention, a multi-operational mode, system of operating a stormwater management (SWM) facility, of the type that has a bottom which has proximate it a gravity-fed, outflow conduit and wherein a third-party provider makes available on the internet a precipitation forecast for the area surrounding the SWM facility, includes: (a) an actuated control valve in the outflow conduit, (b) a depth sensor in the SWM facility, (c) a controller or computing means connected to the actuated control valve, (d) a sensor interface connected to the controller and configured to connect the depth sensor to the controller, (e) a user input means connected to the controller, (f) an internet interface configured to connect the controller to the internet, (g) controller software configured to control the actuated control valve to operate in one of a plurality of operating modes chosen from the group including a standard control (SC) mode and a basic control (BC)

mode, (h) private-cloud-based, internet-accessible, engine software having an Application Programming Interface (API) that enables the engine software to communicate with the third-party provider and a message broker interface that allows the engine software to communicate with the controller software, and wherein the engine software is configured to, for a forecasted precipitation event, utilize the precipitation forecast for the area surrounding the SWM facility to calculate: (1) the quantity of stormwater, $Q_F$, that will flow into the SWM facility if the precipitation forecast is correct, (2) a temporally-varying, targeted depth, $D_T$, for the stormwater in the SWM facility that allows for water to be released at a steady-state discharge rate during a prescribed time period immediately preceding the forecasted precipitation event so as to maintain the depth of the water in the facility at a prescribed, desired depth (note: this may also include dewatering the SWM facility to a prescribed minimum or alternate depth after a prescribed period of dry weather), and (3) the time-dependent, state of the actuated control valve's openness necessary in order to enable the targeted depth, $D_T$, to be achieved in the SWM facility, and (i) wherein, for operation in the SC mode, the controller software further includes a SC portion configured to control the operation of the actuated control valve so as to utilize the engine software calculations to achieve the temporally-varying, targeted depth, $D_T$, for the stormwater in the SWM facility, and (j) wherein, for operation in the BC mode, the controller software further includes a BC portion configured to control the operation of the actuated control valve so as to maintain a design depth, $D_{WQ}$, for the stormwater in the SWM facility that equates to a specified, water-quality, storage volume.

In accordance with a further example of this preferred embodiment, the SC portion of the controller software further includes an Extreme Precipitation Hazard Protection ($H_{EP}$) segment that is configured to ask the question "Is the forecast for the upcoming precipitation event for precipitation depths in excess of, for example, the "NOAA 14" 5-year, 24-hour storm [4.2 inches in Baltimore, Md.]? If Yes—open the control valve so as to dewater the SWM facility, thereby increasing or maximizing the facility's floodwater storage capacity. If No—the control valve remains closed.

In accordance with a still further example of this preferred embodiment, and wherein the third-party provider also makes available on the internet a temperature forecast for the area surrounding the SWM facility, the SC portion of the controller software includes a Freeze Hazard Protection ($H_F$) segment configured to identify when this temperature forecast is for freezing temperatures for the area surrounding the SWM facility for an immediately upcoming, specified time period and, when this freeze identification has occurred, to utilize this occurrence to adjust the depth of the stored stormwater in the SWM facility from the design depth, $D_{WQ}$, to the lesser of a minimum depth ($D_{MIN}$) or alternate user specified freeze hazard depth, ($D_{FH}$).

In accordance with another example of this preferred embodiment, the SC and BC portions of the controller software includes a Mosquito Hazard Protection ($H_M$) segment configured to identify when, during a prescribed portion of the year, the area surrounding the SWM facility has gone for a designated time period ($T_M$) without a precipitation event occurring, and, when this identification has occurred, to utilize this occurrence to adjust the depth of the stormwater in the SWM facility from the design depth, $D_{WQ}$, to the lesser of a minimum depth ($D_{MIN}$) or alternate user specified minimum depth, ($D_{ALT}$).

In accordance with yet another example of this preferred embodiment, both the SC and BC portions of the controller software include an Extended Detention segment configured to identify when the area surrounding the SWM facility has gone for a designated time period without a precipitation event occurring ($T_{ED}$), and, when this identification has occurred, to utilize this occurrence to adjust the depth of the stormwater in the SWM facility from the design depth, $D_{WQ}$, to the lesser of a minimum depth ($D_{MIN}$) or alternate user specified minimum depth, ($D_{ALT}$).

Furthermore, the present invention, SmartSWM, is designed to function off the grid [via solar power], but can also be installed using local line power. Additionally, SmartSWM can be used to enhance the performance of existing stormwater management facilities or can be incorporated into the design of new stormwater management facilities.

Thus, there has been summarized above (rather broadly and understanding that there are other preferred embodiments which have not been summarized above) the present invention in order that the detailed description that follows may be better understood and appreciated.

DESCRIPTION OF THE PREFERRED EMBODIMENT

Figure 1:
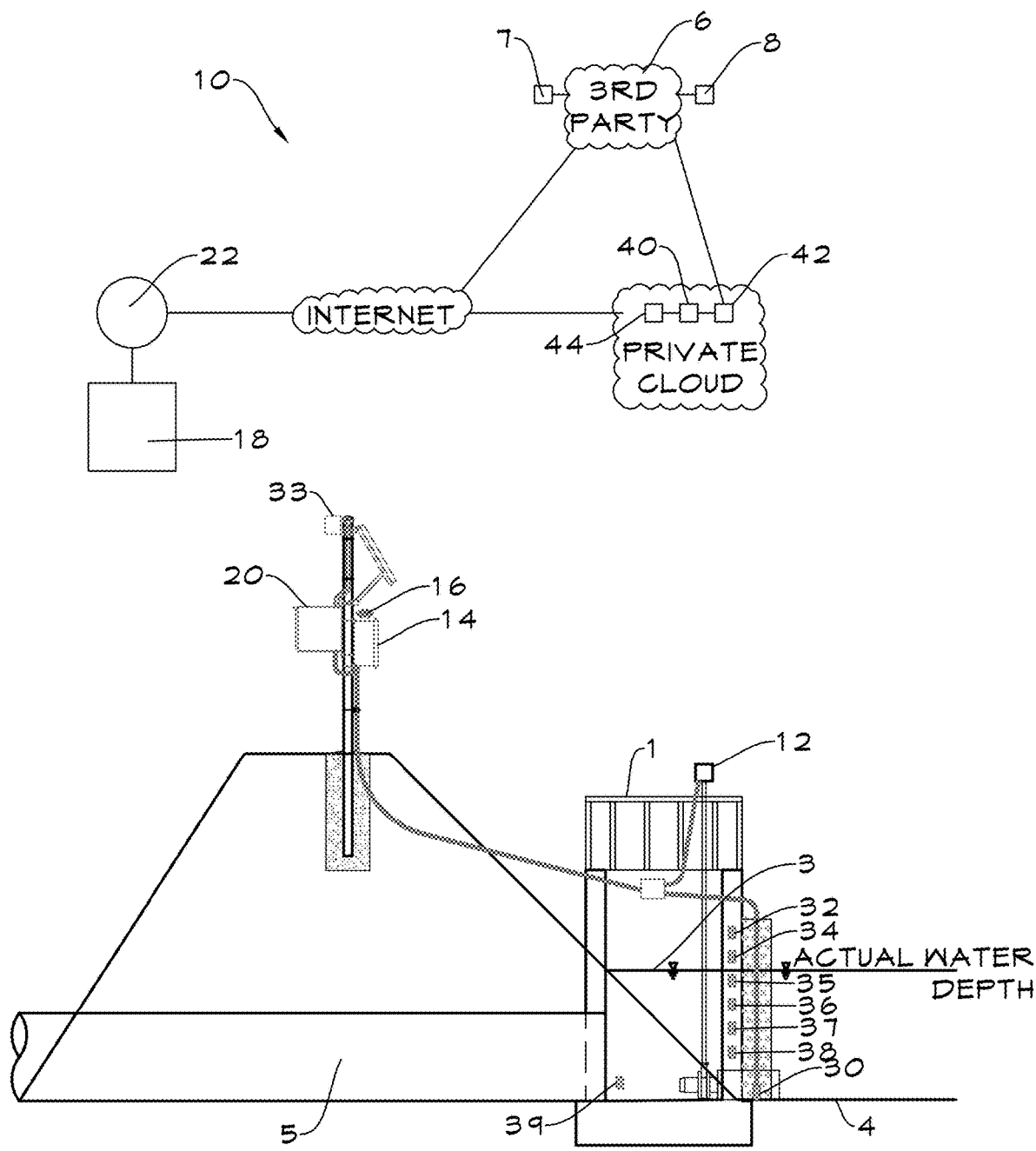
FIG. 1 shows a schematic view of a generalized version of a SWM facility which is holding stormwater whose free surface is at a measurable depth, d, above the bottom of the SWM facility.

Before explaining at least one embodiment of the present invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

Recognizing the need for improvements in the means for controlling the operation of SWM facilities, there is illustrated in FIG. 1 a preferred embodiment of the present invention 10 in the form of a SmartSWM system or method.

FIG. 1 shows a generalized version of a SWM facility 1 which is holding stormwater 2 whose free surface 3 is at a measurable depth, d, above the bottom 4 of the SWM facility and an outflow conduit 5. This outflow conduit is located near the SWM facility's bottom and it allows the stormwater to flow out, when an actuated control valve 12, located in this outflow conduit, is opened, and this outflow then flows, under the influence of gravity, out and into nearby natural streams and other natural bodies of water.

The present invention includes a controller or means for controlling 14 the actuated control valve in the SWM facility's outflow conduit. In a preferred embodiment, this means takes the form of an actuated-control-valve computer or computer means 14 or single-board computer (SBC) which includes a network or internet interface (e.g., a cellular modem) 16 that provides the system with internet connectivity. This connectivity is used to allow the system to connect with a private cloud that it maintains and with, among other things, third-parties 6 who provide precipitation and temperature forecasts 7 and historic weather data 8 that is utilized by the system. Additionally, there resides on this private cloud a script that allows one to download a dashboard to one's computer and on this dashboard are control buttons that when utilized allow one from their computer to send messages back to the broker for use by the engine and/or controller to control the operation of the system's control valve.

Also included is a sensor interface or interface means 18 that allows the SBC to connect with multiple external devices and sensors (e.g., depth 30, temperature 32, rain gauge 33, pH 34, turbidity 35, nitrogen content 36, phosphorous content 37, hydrocarbon content 38, heavy metal content 39). Additionally, the SBC has a user input means 20 (e.g., a touch screen) whereby a system user can input information or directions for the direct control of the operation of the system 10 or actuated control valve 12.

The system's actuated control valve can also be separated from its controller or actuated-control-valve computer 14 using a simple switch. This switch allows for a field override state intended for on-site maintenance activities.

The present invention's depth sensor, such as a pressure transducer, is a very important part since it is used to monitor the current water depth, $D_{MEAS}$, at a SWM facility. Additionally, it can be used to confirm or monitor the operational state of the system's control valve 12.

The system's controller or actuated-control-valve computer 14 runs an actuated-control-valve application or controller software 22 that enables it to determine and send the proper signals to the actuation elements of the control valve that control, for example, the valve's degree of openness.

Additionally, this actuated-control-valve software uses its internet connectivity capability and a message broker interface or software 44 to enable it to communicate with the system's cloud-based, engine software 40. This message broker interface also utilizes the Message Queuing Telemetry Transport (MQTT) protocol or other messaging protocol to broker or allow messages to and from various other devices that are located at a SWM facility.

The system's cloud-based, engine software 40 is given this name because it is in many ways the driving force or engine that, in one mode of operation (e.g., standard control), the present invention uses to guide it in controlling the operation of a SWM facility. The engine software does this by, for a forecasted precipitation event, utilizing the third-party provided, precipitation forecast for the area surrounding the SWM facility to calculate: (1) the volume or quantity of stormwater, $Q_F$, that will flow into the SWM facility if the precipitation forecast is correct, (2) a temporally-varying, targeted depth, $D_T$, for the stormwater in the SWM facility that allows for, if needed, some volume of water to be released at a steady-state discharge rate during a prescribed time period ($T_{DW}$) immediately preceding the forecasted precipitation event so as to maintain or bring the depth of the water in the facility up to its prescribed or desired or design depth, $D_{WQ}$, (e.g., if the forecast is for $Q_F$, and the depth is already at $D_{WQ}$, then $Q_F$ will be released; if the depth is less than $D_{WQ}$ by an amount of water, $\Delta$, then, with the same forecast, $Q_F-\Delta$ will be released; alternatively, if the forecasted precipitation event is after a prescribed period of dry weather, this may include dewatering the SWM facility to a prescribed minimum or alternate depth), and (3) the time-dependent, state of the actuated control valve's openness which is necessary in order to enable the targeted depth, $D_T$, to be achieved in the SWM facility. Thus, this engine software application 40 repeatedly makes calculations, prior to a forecasted precipitation event, to set the temporally varying, target depth level, $D_T$, for the SWM facility.

In order to help the engine application perform these calculation, it uses an Application Programming Interface (API) or software 42 that allows the engine application to talk to the internet-connected applications of the service providers that provide the necessary data points from forecasted precipitation and temperatures 6 and historic weather 7 databases.

The SmartSWM system of the present invention continuously monitors the National Oceanic and Atmospheric Administration's (NOAA) quantitative precipitation and temperature forecast data and other live sensory data in order to make automated decisions on when to release or store water, according to very precise system guidelines, held in a SWM facility.

In its simplest form, the overall software of the SmartSWM system is designed to maximize the residence time of stormwater runoff in a SWM facility between wet weather events so that there is achieved in the stormwater a specified or maximum pollutant load reduction, since the stormwater will experience greater levels of pollutant settling, denitrification, water temperature stabilization and UV based water disinfection when it is held for longer periods.

The overall software of the SmartSWM system is further designed so that the discharge or outflow from a SWM facility occurs in advance of wet weather events. The advantage of this is the elimination of wet weather discharges from the SWM facility during all but the most infrequent, high volume rain events. By operating the SWM facility in this manner, the actual physical boundaries and geometry of the SWM facility becomes a less significant factor in the facility's pollutant removal efficiency.

During a SWM facility's drawdown of its water level, the actions of the SmartSWM system usually includes the opening of an actuated control valve 12 (e.g., butterfly valve) in an outflow conduit of the facility so that the stormwater in the SWM facility is released at a steady-state discharge rate during a prescribed time period ($T_{DW}$) immediately preceding the forecasted precipitation event. The advantage of this steady-state discharge rate is the lessening of potential erosion problems in the natural pathways that the stormwater flows on its way to the natural streams and other natural bodies of water into which this stormwater runoff eventually flows. Once the targeted amount of stormwater has been released, the control valve is closed. Flow through the valve is throttled by controlling the state of the valve's openness in order to achieve a user or other specified flow rate or a minimum, steady-state flow rate which dewaters the facility over a specified drawdown period.

The SmartSWM system is designed to operate autonomously, but can be manually controlled with the system's user input means at the SWM facility. When operating autonomously, the SmartSWM system's actuated-control-valve software 22 has various portions that provide the system with multiple possible operational modes.

However, before we describe in detail some of these operational modes, it proves useful to first define a number of depths of stormwater in the facility and time periods for which the stormwater has been held in the facility, some of which were previously mentioned above. These are defined below and it's later seen that some of the various operational modes of the system are definable, in part, in terms of these depths and temporal holding periods:

$D_{ALT}$—User defined Alternate Drawdown depth, $D_{MAX}$—Maximum depth, the depth at which the SWM facility overflows, $D_T$—Target depth, the optimal, temporally-varying, depth in the SWM facility as calculated by the system's cloud-based, engine software application that utilizes forecasted and historic weather databases, $D_{MIN}$—Permanent depth, the low depth value associated with a desired permanent wet storage volume, $D_{WQ}$—Water quality design depth, the depth associated with the runoff volume in the SWM facility being optimal for pollutant removal.

$D_{FH}$—User defined maximum depth during Active Freeze Hazard (e.g., a freeze-specified alternative depth that equals a depth designed to minimize the hazard associated with a frozen SWM facility surface, e.g., 2 feet), $D_{MEAS}$—Measured current depth as recorded by the system's depth sensor, $T_{DRY}$—Elapsed time since the last precipitation event, $T_M$—Allowable mosquito gestation period, the period of time specified for mosquito gestation, $T_{DW}$—Duration of time allowed for dewatering (based on predefined initial value), $T_{ED}$—Allowable extended detention period, a predefined time period that relates to the adequate settling of sediments and other pollutants contained in the stormwater.

Additionally, it should be noted that the system's ability to switch between its various operational modes is due, in part, to its actuated-control-valve application or software 22 keeping track of the actuated control valve's internet/cloud connected status and then modifying the actuated control valve's behavior or setting based on this status.

As an example of its various operational modes, we consider first the system's standard control (SC) mode. For the operation of this mode, the system must be connected to the internet.

In this mode, the system takes advantage of its internet interface 16 to communicate with the system's private-cloud-based, internet-accessible, engine software 40 that is configured to communicate with a third-party provider and utilize the third-party provider's weather forecast for the area surrounding the SWM facility to calculate: (a) the quantity of stormwater, $Q_F$, that will flow into the SWM facility if the precipitation forecast is correct, (b) a temporally-varying, targeted depth, $D_T$, for the stormwater in the SWM facility that allows for, if needed, some volume of water to be released at a steady-state discharge rate during a prescribed time period ($T_{DW}$) immediately preceding the forecasted precipitation event so as to maintain or bring the depth of the water in the facility up to its prescribed or desired or design depth, $D_{WQ}$, and (c) the time-dependent, state of the actuated control valve's openness necessary in order to enable the targeted depth, $D_T$, to be achieved in the SWM facility.

A SC portion of the controller's software 22 is configured to control the operation of the actuated control valve so as to operate the SWM facility by utilizing the engine software's calculations to achieve the calculated temporally-varying, targeted depth, $D_T$, for the stormwater in the SWM facility. The engine software utilizes computational methods outlined in the 2000 Maryland Stormwater Design Manual or similar hydrologic runoff models and methods in order to convert forecasted precipitation data into site specific runoff volumes that eventually flow into the SWM facility.

Additionally, this SC portion includes an Extreme Precipitation Hazard Protection ($H_{EP}$) segment. This segment is applicable when there is a forecast for an extreme precipitation event (e.g., storms with forecasted precipitation depths in excess of the "NOAA 14" 5-year, 24-hour storm [e.g., 4.2 inches in Baltimore, Md.]). In this situation, the SmartSWM system takes the necessary action to dewater the SWM facility, thereby increasing or maximizing the facility's floodwater storage capacity.

Sill further, this SC portion includes a Freeze Hazard Protection ($H_F$) segment configured to identify when the temperature forecast is for freezing temperatures for the area surrounding the SWM facility for an immediately upcoming, specified time period and, when this freeze identification has occurred, to utilize this occurrence to adjust the depth of the stormwater in the SWM facility from the design depth, $D_{WQ}$, to the lesser of a minimum depth, $D_{MIN}$, or an alternate user specified freeze hazard depth, $D_{FH}$.

A more detailed examination of the SC portion of the system's actuated-control-valve or controller software reveals that it performs a series of routines (i.e., asking and answering a series of questions that have Yes (opening the actuated control valve) or No (keeping the actuated control valve closed) answers) in the following order:

(a) Is Override Active (i.e., has any override directive been received via the internet/)? Yes—open valve; No—valve remains closed (b) Is there an Active Extreme Precipitation Hazard ($H_{EP}$)? Yes—open valve; No—valve remains closed (c) Is $D_{MEAS} > D_{MAX}$ ? Yes—open valve; No—valve remains closed (d) Is $D_{MEAS} > D_{WQ}$ ? Yes—open valve; No—valve remains closed (e) Is $D_{MEAS} > D_T$ ? Yes—open valve; No—valve remains closed (f) Is $T_{DRY} > T_{ED}$ ? Yes—open valve; No—valve remains closed (g) Does the temperature forecast suggest freezing temperatures for the area surrounding the SWM facility for an immediately upcoming, specified period (e.g., 3 days)? If Yes, Is $D_{MEAS} >$ Minimum of $D_{FH}$ & $D_{MIN}$ ? Yes—open valve; No—valve remains closed, (h) Is the current date during a prescribed portion of the year (e.g., from Memorial Day to Labor Day) and has the area surrounding the SWM facility gone for a designated period (e.g., 3 days, the larvae stage for most species of mosquitoes) without a precipitation event occurring? If Yes—open valve; If No—valve remains closed, and wherein this step is taken in order prevent the SWM facility from becoming a mosquito breading ground (with mosquitoes hatching at the periphery of the free surface of the stormwater in the SWM facility) by drawing down the SWM facility's water level to its Permanent depth, $D_{MIN}$, and consequently killing any mosquito larvae and pupae left in the dewatered portions of the SWM facility.

Figure 2:
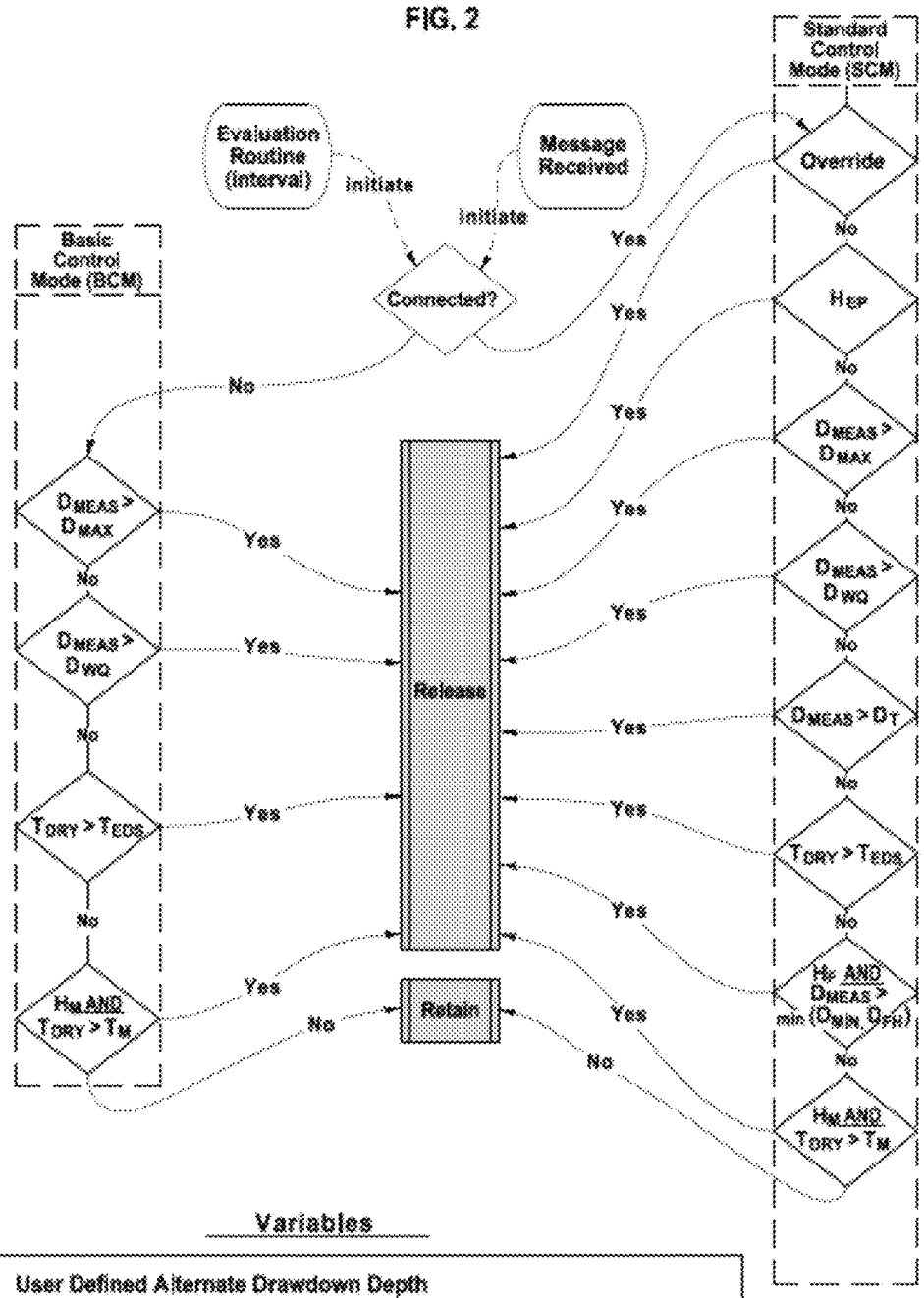
FIG. 2 shows an example of a series of routines (i.e., asking and answering a series of questions that have Yes (opening the actuated control valve) or No (keeping the actuated control valve closed) answers) that are used in either the system's Basic Control (left side) or Standard Control (right side) operational modes.

Once a question is answered Yes and stormwater is released, the progression through the routines ends. See the right side of FIG. 2.

The system's method for actually releasing any stormwater being held in the SWM facility is quite exact. For example, in the SC mode, stored stormwater is usually released over a user defined (e.g., 24 hours) drawdown period ($T_{DW}$) preceding the next forecasted precipitation event in order to achieve a target depth ($D_T$).

The system's engine software calculates the constant discharge rate required to uniformly release the required volume of stored stormwater over the user defined drawdown period ($T_{DW}$). With the stormwater flowing out under the force of gravity alone, to achieve a constant discharge rate, the openness state of the system's actuated control valve is continually-changing since the head or depth of water that is above the valve is continually decreasing as the stormwater is being discharged.

As a second example of the system's various operational modes, we consider what is referred to as the system's "basic control (BC)" mode. For the operation of this mode, the system is disconnected from the internet. This mode of operation is achieved by configuring a BC portion of the controller software 22 to control the operation of the actuated control valve so as to maintain a design depth, $D_{WQ}$, for the stormwater in the SWM facility that equates to a specified and optimum, treated-stormwater, storage volume.

This BC portion, and also the SC portion, of the controller's software 22 is also configured to include a Mosquito Hazard Protection ($H_M$) segment that is configured to identify when, during a prescribed portion of a year, the area surrounding the SWM facility has gone for a designated time period, $T_M$, without a precipitation event occurring, and, when this identification has occurred, to utilize this occurrence to adjust the depth of stormwater in the SWM facility to the lesser of a minimum depth, $D_{MIN}$, or an alternate user specified minimum depth, $D_{ALT}$.

A more detailed examination of the BC portion of the system's actuated-control-valve software reveals that it also performs a series of routines. In a preferred embodiment, the order of these routines in the BC mode is as follows:
(a) Is Override Active? Yes—open valve; No—valve remains closed
(b) Is $D_{MEAS} > D_{MAX}$ ? Yes—open valve; No—valve remains closed
(c) Is $D_{MEAS} > D_{WQ}$ ? Yes—open valve; No—valve remains closed
(d) Is $T_{DRY} > T_{ED}$ ? Yes—open valve; No—valve remains closed
(e) Is the current date during a prescribed portion of the year (e.g., from Memorial Day to Labor Day) and has the area surrounding the SWM facility gone for a designated period (e.g., 3 days, the larvae stage for most species of mosquitoes) without a precipitation event occurring? If Yes—open valve; If No—valve remains closed, and wherein, as previously noted, this step is taken in order prevent the SWM facility from becoming a mosquito breading ground.

Once a question is answered Yes and stormwater is released, the progression through the routines ends. See the left side of FIG. 2.

The foregoing is considered as illustrative only of the principles of the present invention. Further, since numerous modifications and changes will readily occur to those skilled in the art, it is not desired to limit the invention to the exact construction and operation shown and described herein. Accordingly, all suitable modifications and equivalents may be resorted to, falling within the scope of the invention that is hereinafter set forth in the claims to the invention.

I claim:

1. A multi-operational mode, system of operating a stormwater management (SWM) facility that has a gravity-fed, outflow conduit and treats stormwater to provide for the off-gassing of nitrogen & the settling from the stormwater of denser-than-water pollutants, and wherein a third-party provider makes available on the internet a precipitation forecast for the area surrounding said SWM facility, said system comprising:
an actuated control valve in said outflow conduit,
wherein said outflow conduit adapted so that said stormwater flows from said outflow conduit via adjoining natural stormwater pathways and into an adjoining natural body of water,
a depth sensor in said SWM facility,
a computing means connected to said actuated control valve,
a sensor interface connected to said computing means and configured to connect said depth sensor to said computing means,
an internet interface configured to connect said internet to said computing means,
an actuated-control-valve software that is configured to run on said computing means and control the operation of said actuated control valve,
a private-cloud-based, internet-accessible, engine software that has an Application Programming Interface (API) that enables said engine software to communicate with said third-party provider and further having a message broker interface that is configured to allow said engine software to communicate with said actuated-control-valve software,
wherein said depth sensor having a configuration adapted to measure, at any instant in time, the depth of the stormwater in said SWM facility and provide a signal output that is suitable for use by said sensor interface and results in the inputting of said measured depth into said computing means which then directs said internet interface to communicate said measured depth to said engine software, and
wherein said engine software is configured to, for a forecasted precipitation event, utilize said precipitation forecast for the area surrounding said SWM facility to calculate:
(a) a quantity of stormwater that is expected to flow into said SWM facility according to said precipitation forecast, $Q_F$,
(b) a temporally-varying, targeted depth, $D_T$, for the stormwater in the SWM facility that allows for water to be released at a uniform discharge rate during a prescribed time period so as to bring the depth of the water in the said SWM facility to at a prescribed, desired depth after said water release, and
(c) a time-dependent, degree of said actuated control valve opening that is necessary in order to enable said targeted depth, $D_T$, to be achieved in said SWM facility, wherein said engine software is further configured to communicate the said degree of the actuated control valve opening to the said actuated-control-valve software.

2. The system as recited in claim 1, wherein:
said actuated-control-valve software is further configured to control the operation of said actuated control valve to operate in one of a plurality of operating modes chosen from the group including a standard control (SC) mode and a basic control (BC) mode.

3. The system as recited in claim 2, wherein:
for operation in said SC mode, said actuated-control-valve software further includes a SC portion configured to control the operation of said actuated control valve so as to operate said SWM facility to utilize said engine software calculations to control the operation of said actuated control valve to achieve said targeted depth, $D_T$, for said stormwater in said SWM facility, and
for operation in said BC mode, said actuated-control-valve software further includes a BC portion configured to control the operation of said actuated control valve so as to maintain a design depth, $D_{WQ}$, for said stormwater in said SWM facility that equates to a specified, water quality, storage volume.

4. The system as recited in claim 3, wherein:
when said third-party provider also makes available on the internet a temperature forecast for the area surrounding said SWM facility,
said SC portion of said actuated-control-valve software further includes a Freeze Hazard Protection ($H_F$) segment configured to identify when said temperature forecast is for freezing temperatures for the area surrounding the SWM facility for an immediately upcoming, specified time period and, when this freeze identification has occurred, to utilize this occurrence to adjust the depth of the stormwater in said SWM facility from said design depth, $D_{WQ}$, to the lesser of a depth chosen from the group of a minimum depth, $D_{MIN}$, and an alternate user specified freeze hazard depth, $D_{FH}$.

5. The system as recited in claim 3, wherein:
each of said SC and BC portions of said actuated-control-valve software further includes a Mosquito Hazard Protection ($H_M$) segment configured to identify when, during a prescribed portion of a year, said area surrounding said SWM facility has gone for a designated time period, $T_M$, without a precipitation event occurring in the area surrounding said SWM facility, and, when said identification has occurred, to utilize said occurrence to adjust the depth of stormwater in said SWM facility to the lesser of a depth chosen from the group of a minimum depth, $D_{MIN}$, and an alternate user specified minimum depth, $D_{ALT}$.

6. The system as recited in claim 2, wherein:
said SC portion further includes an Extreme Precipitation Hazard Protection ($H_{EP}$) segment that is configured to, in the event of a forecast for an upcoming precipitation event includes precipitation depths in excess of prescribed maximum amount, control the operation of the actuated control valve to release stormwater from said SWM facility so as to increase the floodwater storage capacity of said SWM facility.

7. The system as recited in claim 6, wherein:
each of said SC and BC portions of said actuated-control-valve software further includes a Mosquito Hazard Protection ($H_M$) segment configured to identify when, during a prescribed portion of a year, said area surrounding said SWM facility has gone for a designated time period, $T_M$, without a precipitation event occurring in the area surrounding said SWM facility, and, when said identification has occurred, to utilize said occurrence to adjust the depth of stormwater in said SWM facility to the lesser of a depth chosen from the group of a minimum depth, $D_{MIN}$, and an alternate user specified minimum depth, $D_{ALT}$.

8. The system as recited in claim 2, wherein:
when said third-party provider also makes available on the internet a temperature forecast for the area surrounding said SWM facility,
said SC portion of said actuated-control-valve software further includes a Freeze Hazard Protection ($H_F$) segment configured to identify when said temperature forecast is for freezing temperatures for the area surrounding the SWM facility for an immediately upcoming, specified time period and, when this freeze identification has occurred, to utilize this occurrence to adjust the depth of the stormwater in said SWM facility from said design depth, $D_{WQ}$, to the lesser of a depth chosen from the group of a minimum depth, $D_{MIN}$, and an alternate user specified freeze hazard depth, $D_{FH}$.

9. The system as recited in claim 2, wherein:
each of said SC and BC portions of said actuated-control-valve software further includes a Mosquito Hazard Protection ($H_M$) segment configured to identify when, during a prescribed portion of a year, said area surrounding said SWM facility has gone for a designated time period, $T_M$, without a precipitation event occurring in the area surrounding said SWM facility, and, when said identification has occurred, to utilize said occurrence to adjust the depth of stormwater in said SWM facility to the lesser of a depth chosen from the group of a minimum depth, $D_{MIN}$, and an alternate user specified minimum depth, $D_{ALT}$.

10. The system as recited in claim 2, wherein:
each of said SC and BC portions of said actuated-control-valve software further includes an Extended Detention segment configured to identify when the area surrounding the SWM facility has gone for a designated time period without a precipitation event occurring, $T_{ED}$, and, when this identification has occurred, to utilize said occurrence to adjust the depth of the stormwater in the SWM facility to the lesser of a depth chosen from the group of a minimum depth, $D_{MIN}$, and an alternate user specified minimum depth, $D_{ALT}$.

11. A multi-operational mode, method of operating a stormwater management (SWM) facility that has a gravity-fed, outflow conduit and treats stormwater to provide for the off-gassing of nitrogen & the settling from the stormwater of denser-than-water pollutants, and wherein a third-party provider makes available on the internet a precipitation forecast for the area surrounding said SWM facility, said method comprising the steps of:
placing an actuated control valve in said outflow conduit,
adapting said outflow conduit so that said stormwater flows from said outflow conduit via adjoining natural stormwater pathways and into an adjoining natural body of water,
placing a depth sensor in said SWM facility,
connecting a computing means to said actuated control valve,
connecting a sensor interface to said computing means and configuring said sensor interface to connect said depth sensor to said computing means,
providing an internet interface configured to connect said internet to said computing means,
providing an actuated-control-valve software that is configured to run on said computing means and control the operation of said actuated control valve,
providing a private-cloud-based, internet-accessible, engine software that has an Application Programming Interface (API) that enables said engine software to communicate with said third-party provider and further having a message broker interface that is configured to allow said engine software to communicate with said actuated-control-valve software,
wherein said depth sensor having a configuration adapted to measure, at any instant in time, the depth of the stormwater in said SWM facility and provide a signal output that is suitable for use by said sensor interface and results in the inputting of said measured depth into said computing means which then directs said internet interface to communicate said measured depth to said engine software, and wherein said engine software configured to, for a forecasted precipitation event, utilize said precipitation forecast for the area surrounding said SWM facility to calculate:
(a) a quantity of stormwater that is expected to flow into said SWM facility according to said precipitation forecast, $Q_F$,
(b) a temporally-varying, targeted depth, $D_T$, for the stormwater in the SWM facility that allows for water to be released at a uniform discharge rate during a prescribed time period so as to bring the depth of the water in said SWM facility at a prescribed, desired depth, and
(c) a time-dependent, degree of said actuated control valve opening that is necessary in order to enable said targeted depth, $D_T$, to be achieved in said SWM facility, wherein said engine software is further configured to communicate the said degree of the actuated control valve opening to the said actuated-control-valve software.

12. The method as recited in claim 11, wherein:
said actuated-control-valve software is further configured to control the operation of said actuated control valve to operate in one of a plurality of operating modes chosen from the group including a standard control (SC) mode and a basic control (BC) mode.

13. The method as recited in claim 12, wherein:
for operation in said SC mode, said actuated-control-valve software further includes a SC portion configured to control the operation of said actuated control valve so as to operate said SWM facility to utilize said engine software calculations to control the operation of said actuated control valve to achieve said targeted depth, $D_T$, for said stormwater in said SWM facility, and
for operation in said BC mode, said actuated-control-valve software further includes a BC portion configured to control the operation of said actuated control valve so as to maintain a design depth, $D_{WQ}$, for said stormwater in said SWM facility that equates to a specified, water quality storage volume.

14. The method as recited in claim 13, wherein:
when said third-party provider also makes available on the internet a temperature forecast for the area surrounding said SWM facility,
said SC portion of said actuated-control-valve software further includes a Freeze Hazard Protection ($H_F$) segment configured to identify when said temperature forecast is for freezing temperatures for the area surrounding the SWM facility for an immediately upcoming, specified time period and, when this freeze identification has occurred, to utilize this occurrence to adjust the depth of the stormwater in said SWM facility from said design depth, $D_{WQ}$, to the lesser of a depth chosen from the group of a minimum depth, $D_{MIN}$, and an alternate user specified freeze hazard depth, $D_{FH}$.

15. The method as recited in claim 13, wherein:
each of said SC and BC portions of said actuated-control-valve software further includes a Mosquito Hazard Protection ($H_M$) segment configured to identify when, during a prescribed portion of a year, said area surrounding said SWM facility has gone for a designated time period, $T_M$, without a precipitation event occurring in the area surrounding said SWM facility, and, when said identification has occurred, to utilize said occurrence to adjust the depth of stormwater in said SWM facility to the lesser of a depth chosen from the group of a minimum depth, $D_{MIN}$, and an alternate user specified minimum depth, $D_{ALT}$.

16. The method as recited in claim 12, wherein:
said SC portion further includes an Extreme Precipitation Hazard Protection ($H_{EP}$) segment that is configured to, in the event of a forecast for an upcoming precipitation event includes precipitation depths in excess of prescribed maximum amount, control the operation of the actuated control valve to release stormwater from said SWM facility so as to increase the floodwater storage capacity of said SWM facility.

17. The method as recited in claim 16, wherein:
each of said SC and BC portions of said actuated-control-valve software further includes a Mosquito Hazard Protection ($H_M$) segment configured to identify when, during a prescribed portion of a year, said area surrounding said SWM facility has gone for a designated time period, $T_M$, without a precipitation event occurring in the area surrounding said SWM facility, and, when said identification has occurred, to utilize said occurrence to adjust the depth of stormwater in said SWM facility to the lesser of a depth chosen from the group of a minimum depth, $D_{MIN}$, and an alternate user specified minimum depth, $D_{ALT}$.

18. The method as recited in claim 12, wherein:
when said third-party provider also makes available on the internet a temperature forecast for the area surrounding said SWM facility,
said SC portion of said actuated-control-valve software further includes a Freeze Hazard Protection ($H_F$) segment configured to identify when said temperature forecast is for freezing temperatures for the area surrounding the SWM facility for an immediately upcoming, specified time period and, when this freeze identification has occurred, to utilize this occurrence to adjust the depth of the stormwater in said SWM facility from said design depth, $D_{WQ}$, to the lesser of a depth chosen from the group of a minimum depth, $D_{MIN}$, and an alternate user specified freeze hazard depth, $D_{FH}$.

19. The method as recited in claim 12, wherein:
each of said SC and BC portions of said actuated-control-valve software further includes a Mosquito Hazard Protection ($H_M$) segment configured to identify when, during a prescribed portion of a year, said area surrounding said SWM facility has gone for a designated time period, $T_M$, without a precipitation event occurring in the area surrounding said SWM facility, and, when said identification has occurred, to utilize said occurrence to adjust the depth of stormwater in said SWM facility to the lesser of a depth chosen from the group of a minimum depth, $D_{MIN}$, and an alternate user specified minimum depth, $D_{ALT}$.

20. The method as recited in claim 12, wherein:
each of said SC and BC portions of said actuated-control-valve software further includes an Extended Detention segment configured to identify when the area surrounding the SWM facility has gone for a designated time period without a precipitation event occurring, $T_{ED}$, and, when this identification has occurred, to utilize said occurrence to adjust the depth of the stormwater in the SWM facility to the lesser of a depth chosen from the group of a minimum depth, $D_{MIN}$, and an alternate user specified minimum depth, $D_{ALT}$.

* * * * *